US006978228B1

(12) United States Patent
Gordon

(10) Patent No.: US 6,978,228 B1
(45) Date of Patent: Dec. 20, 2005

(54) METHOD OF PERFORMING A SYSTEM REVERSE ENGINEERING PROCESS

(76) Inventor: Graham Paul Gordon, 519 Moore Road, Glenwood, Durban 4001 (ZA)

( * ) Notice: Subject to any disclaimer, the term of this patent is extended or adjusted under 35 U.S.C. 154(b) by 0 days.

(21) Appl. No.: 09/868,270

(22) PCT Filed: Dec. 14, 1999

(86) PCT No.: PCT/IB99/01989

§ 371 (c)(1),
(2), (4) Date: Jun. 14, 2001

(87) PCT Pub. No.: WO00/38051

PCT Pub. Date: Jun. 29, 2000

(30) Foreign Application Priority Data

Dec. 18, 1998 (ZA) .................................. 98/11657

(51) Int. Cl.[7] .............................................. G06F 17/50
(52) U.S. Cl. .................... 703/1; 717/142; 717/104; 717/125; 717/105; 717/168
(58) Field of Search ................... 703/1, 22; 717/103, 717/104, 142, 168, 125, 105, 1, 174; 704/222; 370/408; 707/100, 4; 345/840; 435/287

(56) References Cited

U.S. PATENT DOCUMENTS

| | | | | | |
|---|---|---|---|---|---|
| 5,995,969 | A | * | 11/1999 | Lee et al. ................... 707/100 |
| 6,018,627 | A | * | 1/2000 | Iyengar et al. .............. 717/103 |
| 6,031,535 | A | * | 2/2000 | Barton ....................... 345/840 |
| 6,038,393 | A | * | 3/2000 | Iyengar et al. .............. 717/104 |
| 6,061,513 | A | * | 5/2000 | Scandura .................... 717/142 |
| 6,163,776 | A | * | 12/2000 | Periwal ........................ 707/4 |
| 6,199,198 | B1 | * | 3/2001 | Graham ...................... 717/105 |
| 6,256,607 | B1 | * | 7/2001 | Digalakis et al. ............ 704/222 |
| 6,339,838 | B1 | * | 1/2002 | Weinman, Jr. .............. 717/104 |
| 6,385,766 | B1 | * | 5/2002 | Doran et al. ................. 717/174 |
| 6,421,349 | B1 | * | 7/2002 | Grover ....................... 370/408 |
| 6,515,304 | B1 | * | 2/2003 | Kash et al. ................... 257/79 |
| 6,535,915 | B1 | * | 3/2003 | Valys et al. ................. 709/222 |
| 6,635,469 | B1 | * | 10/2003 | Litt et al. ................. 435/287.1 |
| 2001/0052108 | A1 | * | 12/2001 | Bowman-Amuah ............ 717/1 |
| 2002/0170048 | A1 | * | 11/2002 | Zgarba et al. .............. 717/168 |
| 2004/0205726 | A1 | * | 10/2004 | Chadgey et al. ............. 717/125 |
| 2004/0210445 | A1 | * | 10/2004 | Veronese et al. .............. 705/1 |

OTHER PUBLICATIONS

Aiken et al., "A framework for reverse engineering DOD Legacy information systems", IEEE, 1993.*
Canfora et al., A reverse engineering method for identifying reusable abstract data types', IEEE, 1993.*
Yang, "The supporting environment for a reverse engineering system- The maintainer's assistant", IEEE, 1991.*

(Continued)

Primary Examiner—Paul L. Rodriguez
Assistant Examiner—Kandasamy Thangavelu
(74) Attorney, Agent, or Firm—James Ray & Associates

(57) ABSTRACT

The invention relates to a method of performing a system reverse engineering process. The method provides for an examination of the application system that requires reverse engineering by examining the entire network structure forming the system, by tracking chains of nodes and links in accordance with a predetermined tracking method, that will ensure a complete examination. The information gathered from the examination will permit formatting of the information into a form in which it represents the application system in a usable form. The method of the invention provides also for the creation of a software program or an entire software system that can be employed for carrying out the reverse engineering process.

12 Claims, 15 Drawing Sheets

OTHER PUBLICATIONS

Figure 1:
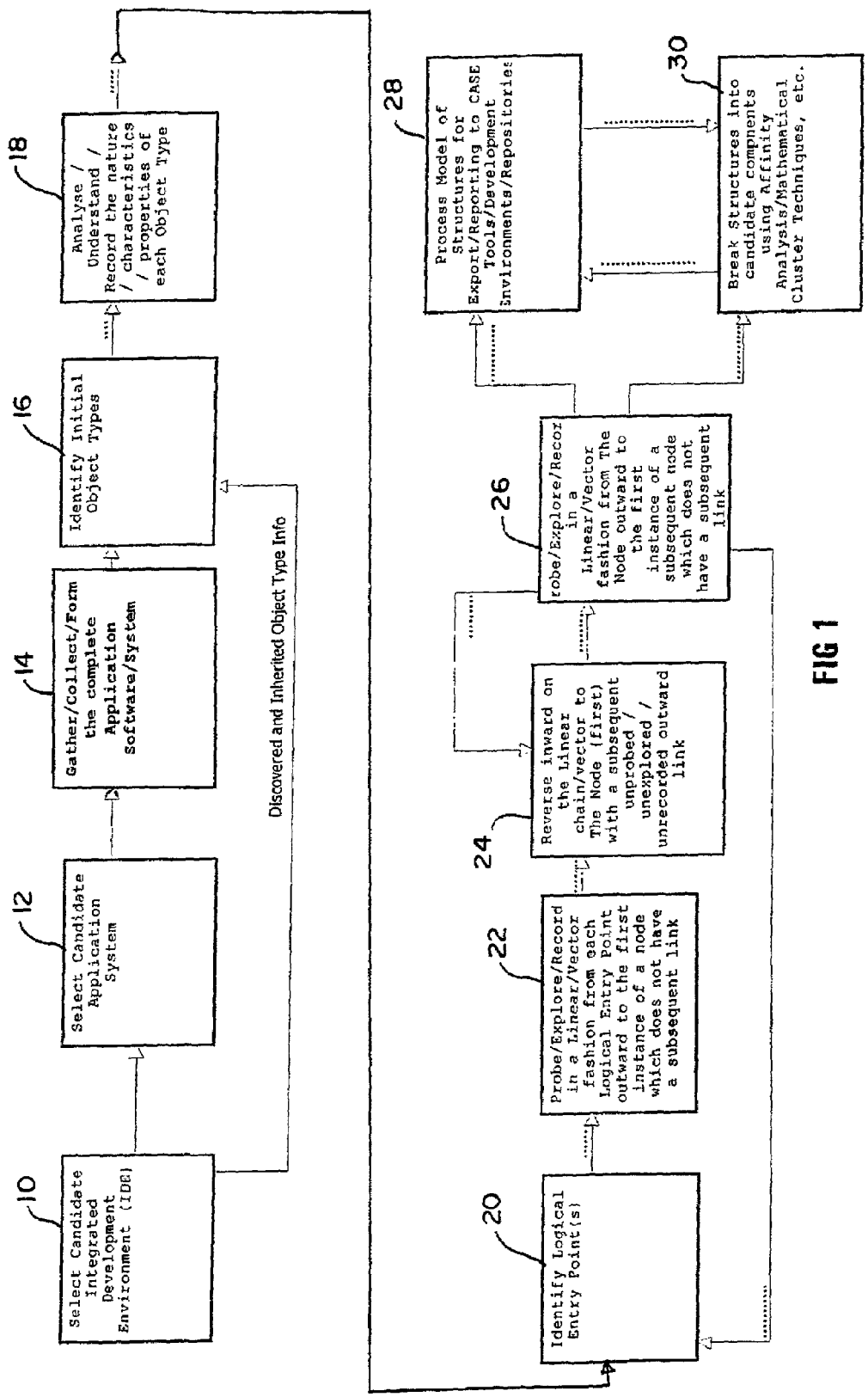

Chu et al., "Component reuse through reverse engineering and semantic interface analysis", IEEE, 1995.*

Huang et al., "A rule-based tool for reverse engineering from source code to graphical models", IEEE, 1992.*

Nagaoka et al., "A reverse engineering method and experiences for industrial COBOL system", IEEE, 1997.*

Gall, H. et al: 'Balancing in reverse engineering and in object-oriented systems engineering to improve reusability and maintainability', proceedings of the annual international computer software and applications conference (compsac), US, Los Alamitos, IEEE Comp. Soc. Press. vol. Conf. 18, Page(s) 35-42, XP000611144, ISBN: 0-8186-6707-9.

* cited by examiner

Comprehensive Automated
Reverse Engineering
Process / Method
Example

Limited to a single entry point of a
SQL Integrated Development
Environment.

*SQL Data Definition*
*"Create Table" statement*

FIG 3A

Overview

- This example uses a non-systems oriented example (Crazy Filming Co.)
- The example steps are cross referenced against an extract of a Comprehensive Automated Reverse Engineering exercise on a subset of a working Application System.

FIG 3B

Identify an Application System

- An application system representing a complete business application must be located. Step 1
- This will be the source system for Comprehensive Automated Reverse Engineering. Step 1

FIG 3C

Gather all input files into VIRTUAL file (memory)

- For each physical input file Step 2
  - Read all lines from the input file into the VIRTUAL file Step 2

FIG 3D

Analyse, Parse and Record all Metadata in VIRTUAL file

- For each line in the VIRTUAL file, we iterate Step 3, 8 & 9
  - Assign the current line to storage variable
  - If line has "create table" then
    - Start looking for the "end of create table" marker by starting a new iteration, from the current position in the list. Step 3
    - Read the first of the new set of lines and reformat to ensure we have no unnecessary characters (tab stops and double spaces) in the line. Step 3

FIG 3E

Analyse, Parse and Record all Metadata in VIRTUAL file

- While the current line does not contain the "end of table" marker then: Step 4
  - Concatenate the current line with the storage variable Step 4
- Concatenate the current line, which contains the "end of table" marker, with the storage variable. Step 4
- If format of "create table" statement is correct then Step 4
  - Strip the table name from the table definition, and store each as a substring. Step 4

FIG 3F

Analyse, Parse and Record all Metadata in VIRTUAL file

- Check if the table item exists in our nodal model, if it does not then: Step 5
  - Add the table name to the list of tables with a unique ID. Step 6
  - Trim known garbage from the ends of the table definition. Step 7
  - Find fields within the table defintion. Step 7

FIG 3G

Analyse, Parse and Record all Metadata in VIRTUAL file

- For each of the fields in the table definition line Step 4 & 7
  - Split the field into field name, field type, field storage format and field data entry constaint. Step 4
  - Check if it exists as nodal item linked to this table item, if it does not, then: Step 5
    - > Add the field to the list of fields with a unique ID. (Record) Step 6
    - > Add a tablefield link to the list of links for this field and current table. Step 6

FIG 3H

Analyse, Parse and Record all Metadata in VIRTUAL file

- Else if format of "create table" incorrect then
  Step 4 & 7
  - Identify the incorrect statements line number, file name and location of file. Step 4
  - Check if this Unkown item exists as nodal item linked to the current file, if it does not, then:
    Step 5
    - Add the incorrect statement to the list of "Unkown" items with a unique ID Step 6
    - Add an unknownfile link to the list of links for this Unknown and respective file Step 6

FIG 3I

Analyse, Parse and Record all Metadata in VIRTUAL file

- End of has "create table" condition. Step 8 & 9
- If line has "create index" then
  - Check validity of create index statement. If it's invalid,
    - Identify the incorrect statements line number, file name and location of file. Step 4
    - Check if this Unkown item exists as nodal item linked to the current file, if it does not, then:
      Step 5
      - Add the incorrect statement to the list of "Unkown" items with a unique ID Step 6
      - Add a unknownfile link to the list of links for this Unknown and respective file Step 6

FIG 3J

Analyse, Parse and Record all Metadata in VIRTUAL file

- If the create index statement is valid:
    - Identify the field that the index is being created on. Step 4
    - Check if this "create index" item exists as nodal item linked to the identified field, if it does not exist: Step 5
        - Add the "create index" item to the nodal item list of indexes with a unique identifier. Step 6
        - If the field being indexed does not yet exist, add the new "create index" item to the list of items pending linkage. Step 6
        - Else Create an indexField link to the list of links that connects this "create index" to the affected field. Step 6

FIG 3K

Analyse, Parse and Record all Metadata in VIRTUAL file

- If the "create index" statement exists: Step 5
    - Add the incorrect or duplicate statement to the list of "Unkown" items with a unique ID Step 6
    - Add a unknownIndex link to the list of links for this Unknown and its respective field. Step 6
- End of VIRTUAL file iteration. Step 10

FIG 3L

Analyse, Parse and Record all Metadata in VIRTUAL file

- Iterate through list of items pending linkage. Step 7
    - If an the current unlinked item now has valid links:
        - create an item specific link item in the link list. Step 6
    - If the current unlinked item still has invalid link points:
        - Add an unknown item to the list of unknown items with a unique identifier. Step 6
        - Add a link from this unknown item to the file the unlinked item occurred in, and the line in that file. If there is a single side to the link, add an unknown item link from this unsuccessful link object to the known link point. Step 6
- End of items pending linkage iteration.

FIG 3M

Actual Data Manipulation Stages

FIG 3N

Original Statement In SQL Definition File

```
create table cheqmast
  (
    cheque no integer,
    cheque value decimal(9,2) not null,
    date chque date,
    practice char(7),
    delind char(1)
  );
create index i cheqmast on cheqmast (
  cheque no );
```

FIG 3O

After Concatenation and Whitespace Cleaning

```
create table cheqmast (cheque no
  integer,cheque value decimal (9,2) not
  null,date chque date,
practice char (7),delind char (1)
);
```

Validity is tested at this point.

FIG 3P

After Stage One Reformatting (No space before comma)
```
create table cheqmast(cheque no
  integer,cheque value decimal(9,2) not
  null,date chque date,
practice char(7),delind char(1)
);
```

FIG 3Q

After Stage Two Reformatting (Single space after open bracket)
```
create table cheqmast( cheque no
  integer,cheque value decimal( 9,2) not
  null,date chque date,
practice char( 7),delind char( 1)
);
```

FIG 3R

After Stage Three Reformatting (Single space after open comma)
```
    create table cheqmast( cheque no integer,
      cheque value decimal( 9, 2) not null,
      date chque date,
    practice char( 7), delind char( 1)
    );
```

FIG 3S

After Stage Four Reformatting (Single space before closing bracket)
```
    create table cheqmast( cheque no integer,
      cheque value decimal( 9, 2 ) not null,
      date chque date,
    practice char( 7 ), delind char( 1 )
    );
```

FIG 3T

Split Table Name and Definition

```
create table cheqmast( cheque no integer,
    cheque value
decimal( 9, 2 ) not null, date chque date,
practice char( 7 ), delind char( 1 )
);
```
And leaves us with:

Table name         : cheqmast
Table definition   : ( cheque_no integer, cheque_value
                     decimal( 9, 2 ) not null, date_chque date,
                     practice char( 7 ), delind char( 1 )
                     );
The table node is stored.

FIG 3U

After Trim known garbage from the ends of the definition

```
cheque no integer, cheque value decimal( 9, 2
) not null, date chque date,
practice char( 7 ), delind char( 1 )
```

FIG 3V

After Splitting Fields

```
cheque no integer
cheque value decimal( 9, 2 ) not null
date chque date
practice char( 7 )
delind char( 1 )
```

FIG 3W

Find data types, formats and constraints, finds the following

```
cheque value decimal( 9, 2 ) not null
^----------^ ^-----^  ^--^   ^------^
   Name        Type   Format  Constraint
```

Which is stored as:
- Field Name : cheque_value
- Field Type : decimal
- Field Storage Format : 9, 2
- Field Data Entry Constraint : not null Each of the field nodes are stored and linked, using a link node, to their respective table node and the next table node is found and analysed.

FIG 3X

Analyse "create index" statement

```
create index i_cheqmast on cheqmast(cheque_no);
^----------^^---------^   ^-----^ ^------^
   Statement    Name       Table    Field
```

Which is stored as:

Index Name          : i_cheqmast
  Index Table         : cheqmast
  Field to index on   : cheque_no If the table cheqmast does not yet exist, or does not yet have a field by the name cheque_no, the "create index" object is created and placed in the "to link" list.

If the table and field both exist, the "create index" object is created and an index-field link is added to the list of links.

FIG 3Y

METHOD OF PERFORMING A SYSTEM REVERSE ENGINEERING PROCESS

THIS INVENTION relates to a method of performing a system reverse engineering process.

It is known that as a result of software system accretion, which occurs when systems are linked together, when systems are built on or hacked into in a relatively unstructured mode to effect quick fixes or changes, when systems are modified to accommodate other systems and/or the like, a conglomerate system can result which, for various reasons, can no longer be easily managed and which is not understood in all respects. In extreme cases this can result in a system becoming obsolete, inutile, or too complicated to continue to operate and work with, essentially requiring system replacement.

The latter option often is not economically or technically feasible and in order to at least alleviate the problem identified and for various other reasons, system reverse engineering processes have been developed whereby conglomerated systems can be re-engineered into a workable format. System reverse engineering processes involve essentially the examination of the existing system, the documentation of the system, modelling of the system, analyzing of the system and understanding of the system, whereafter it is possible to re-engineer the system into a workable and useful format.

A system that requires to be reverse engineered as herein envisaged, hereinafter referred to as the application system, comprises a network structure of nodes and links, the nodes and links forming chains that either terminate in a final node or that form a closed loop that extends from a node and returns to the same node. Network structures are further complicated insofar as two or more links can extend from a node and by keeping in mind that a network structure could include millions of nodes and links, it will be appreciated that very intricate structures can result. The individual nodes and links referred to essentially are object instances and messages disposed between the object instances, representing activity and data elements which are associated with the operation of the system, for carrying out its required purpose or purposes.

In order to apply a reverse engineering process to an application system, it is required to obtain a full understanding of the system, i.e. an understanding of the operation of the network structure forming the system, in order to permit the system to be reverse engineered into a format which permits a model of the system to be created with the aid of a suitable CASE tool (Computer Aided Software/Systems Engineering) or any other categories of suitable visualisation tools. The examination of an application system in order to acquire an understanding of the system conventionally involves an overall consideration of the system and then progressively delving into the system from a number of predetermined starting points, delving deeper and deeper into the system until the required understanding is acquired. This generally requires the cooperation of a team of suitably qualified systems engineers who will cooperate with one another and add their knowledge together until the required level of understanding of the system is acquired, which then permits reverse engineering. This examination system is well known and produced desired results in relation to relatively simpler and less dynamically changing application systems where systems engineers could acquire a sufficient overall picture of the system to permit reverse engineering thereof, but in relation to more complex and dynamic systems this method of examination became too complex and time consuming and, as such, impractical.

The known approach to system reverse engineering was identified by GALL H et al, under the title "Balancing in Reverse Engineering and in Object—Oriented Systems Engineering to Improve Reusability and Maintainability", during proceedings of the Annual International Computer Software and Applications Conference (COMPSAC), US, Los Alamitos, IEEE Comp. Soc. Press, Vol. Conf. 18, Page(s) 35–42, XP 000611144, ISBN: 0-8186-6707-9 and particularly also in a reference cited therein and identified as P. Benedusi, A. Cimitile, and U. de Carlini. Reverse Engineering Processes, Design Document Production, and Structure Charts. The Journal of Systems and Software, 19 (3): 225–245, November 1992.

The above references clearly identify known system reverse engineering processes as goal orientated processes. A goal orientated process involves only an examination of predetermined parts of a system to be reverse engineered, particularly to extract and understand these parts to the extent that they can be reverse engineered into a format which accommodates a predetermined goal. Such processes clearly are limited processes which accommodate only specific goals. This limitation of reverse engineering to merely achieve goals has always been considered essential in order to render reverse engineering practically possible and particularly when more complex systems are involved, even merely to reverse engineer to the extent of achieving defined goals has proven to be extremely difficult.

The more complex application systems requiring reverse engineering therefore cannot be economically salvaged, even with the aid of software programs assisting with the examination process as above envisaged. As such, it is an object of this invention to provide an improved method of performing a system reverse engineering process which will permit more complex application systems to be reverse engineered to a workable format and to make reverse engineering of less valuable systems commercially viable.

According to the invention there is provided a method of performing a system reverse engineering process, which includes the steps of identifying the application system that requires reverse engineering and gathering the entire system and identifying the development environment associated with the system;

identifying initial object types that can serve as starting points from where an examination of the system can be initiated and analyzing the nature, characteristics and properties of each object type;

identifying entry points, in the form of object instances of certain object types, for entering the system to carry out the examination of the system;

examining from selected entry points the network structure forming the application system by tracking chains of nodes and links, each chain being tracked until the instance of a node that does not have a link or the return of the chain to a previously examined node, then reverse tracking the chain to a node from which another chain extends and selectively tracking said other chain and continuing the process until all the chains within the network structure have been tracked, the tracking of the chains including an examination of each node and link and a recordal of information so gathered; and from the information gathered by the network examination, formatting the information gathered into a form in which it represents the application system in a usable form.

In identifying the application system that requires reverse engineering and gathering the entire system, it must be ensured that the important components of the system are taken account of in order to ensure the effectiveness of the reverse engineering process. It must be appreciated also that the application system that requires reverse engineering may comprise two or more separate systems having common elements, or a conglomeration of two or more systems. Any reference herein to an application system must be interpreted as such.

In identifying the development environment, which may be an integrated development environment, the method of the invention may include identifying aspects of the development environment selected from a group including program language and syntax used, the mechanisms of storage of data, the interface of the above, component libraries, code management systems, and the like.

The object types identified typically may fall into multiple categories or groups, including process or activity control elements, data management elements and interface elements. The object types within these groups generally are manifest in nodes and links which are in the form of object instances and messages and which form the overall network structure representing the application system. It is believed in this regard that the vast majority, if not all, development environments ranging from old legacy development environments to modern object oriented integrated development environments and any application systems built therein are essentially networks of nodes and links or objects and messages which can be modelled or described by notations such as the Unified Modelling Language (UML) inter alia but not limited thereto.

The examination of the network structure comprises an examination of each node and each link in the structure to the extent that the nature, characteristics and properties of each node and each link can be associated with object types through analysis, matching, mapping and understanding thereof, and gathering and recording all the information of each node and each link, which may include inheriting information from known or predefined object type information about the development environment.

The entry points identified therefore may comprise the nodes from which a complete examination of the entire network structure of the application system can be initiated. The examination of the network structure also involves the complete tracking of each chain to its termination or return to an earlier node in the chain, before a further chain is selected and tracked. The tracking of chains within the examination of the network structure may include a comparison and classification of nodes and links as object instances, to establish whether they conform with known or unknown object types.

The information gathered from the examination of the network structure will enable a complete understanding of the network structure and particularly also its object types and their object instances, which in turn will permit formatting of this information into a logical format in which the application system is again rendered usable.

The method of the invention particularly provides for formatting of the information gathered into a format in which the information can be exported/reported to CASE tools, development environments and/or repositories, enabling the creation of a model of the application system. As such, formatting may include breaking structures into candidate components by using affinity analysis, mathematical clustering techniques, and the like.

The method of the invention provides still further for the employment of software and/or hardware for assisting with the identification of object instances of object types and the analysis of the nature, characteristics, attributes, operations and properties of each object instance and object type identified, the identification of entry points for entering the system to carry out the examination of the network structure forming the system, the actual examination of the network structure and the formatting of the information gathered by the examination of the network structure into a usable form.

As such, the method of the invention includes creating a software program or an entire software system that can be employed for the above purpose in respect of the particular application system being reverse engineered. A software program, as envisaged, must be interpreted to include any substitute for such a program, which may be a hardware component, or the like.

Furthermore, in relation to the employment of the software program as a result of which object types are identified which were not originally accounted for, the method of the invention may include modifying the software program in order to take into account the object types so identified. This may include also modifying the base of object type information already gained which may be described in the UML but not limited thereto.

It will be understood in the above regard that although it is the employment of the software program that renders the method practically feasible, particularly in relation to more complex application systems, it is the method steps as defined and which must be followed, which renders the use of a software program for the purpose practically feasible.

The method of performing a system reverse engineering process, in accordance with the invention, can be used in respect of a wide range of application systems that are associated with the problems hereinabove identified, the method of the invention essentially enabling these application systems to be salvaged by re-formatting of the systems through the reverse engineering thereof into a form in which the systems again be made practically usable.

Figure 2:
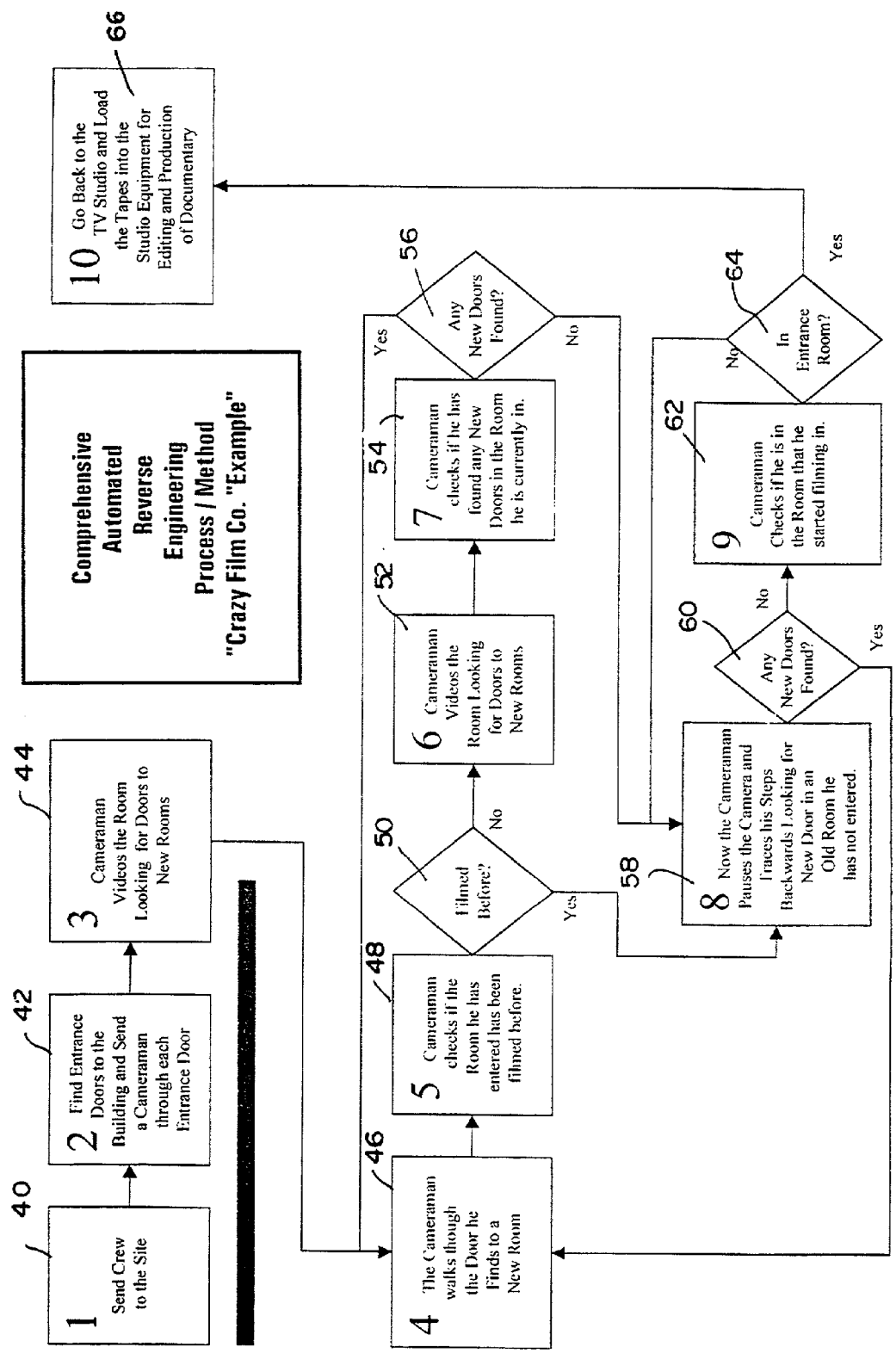

The method of performing a system reverse engineering process, in accordance with the invention, is described hereinafter with reference to the accompanying diagrams. In the diagrams:

FIG. 1 illustrates diagrammatically in block diagram form a flow chart illustrating the method of performing a system reverse engineering process, in accordance with the invention;

FIG. 2 illustrates diagrammatically in block diagram form a flow chart setting out a non-application system process for illustrating the method of performing a system reverse engineering process, in accordance with the invention; and FIG. 3 (13 pages) illustrates diagrammatically in block form a particular example of a method of performing a system reverse engineering process, in accordance with the invention, referring by way of explanation to the block diagram illustrated in FIG. 2.

Referring initially to FIG. 1 of the drawings, a method of performing a system reverse engineering process, in accordance with the invention, is illustrated as a flow chart in block diagram form. Blocks 10, 12 and 14 represent the initiation of the method which includes the selection/identification of the application system that requires reverse engineering, the gathering of all the components of the application system which are required for the operation of the entire system and the identification/selection of the development environment associated with the system. This development environment may be an integrated development environment which includes the program language and syntax used, the mechanisms of storage of data and the interface of the above. Clearly, the development environment also may include other aspects which are associated directly with the application system involved such as component libraries and code management systems.

Blocks 16 and 18 represent the method steps of identifying initial object types incorporated within the system and that can serve as starting points from where an examination of the system must be initiated and analyzing and understanding the nature, characteristics and properties of each object type to enhance still further the overall understanding of the system and the associated development environment. It must be appreciated in this regard that the object types identified essentially will fall into multiple categories or groups, i.e. a first group may include process, activity or control elements, a second group may include data management elements and a third group may include interface elements. Examples of object types falling within the above three groups are set out below:

Examples of Process, Activity or Control Elements as Object Types
   Program
   Procedure
   Sub-Procedure
   Library Procedure
   Class
   Call
   Invocation
   Message
   Command/Verb
   Statement
   Algorithm Flow/Control
   Rules/Conditions
   Method
   Operation
   Service Examples of Data Management Elements
   Table
   Field
   File
   Entity
   Attribute
   Relationship
   Relation
   Array
   Variable
   Parameter
   Pointer
   Message Examples of Interface Elements ("things" the user of the application system sees or interacts with or interface elements to other systems.)
   Dialog
   Report
   Screen (Read-only, Read-write)
   Menu
   Window
   List
   Button
   Text Box
   Check Box
   Radio Button
   Tree It will be understood that additional object types falling within the above groups may be implemented in object instances within an application system and, as set out hereafter, these object types, once identified through the method of reverse engineering as hereinafter described, can then be categorized on an ad-hoc basis. It must also be understood at this stage that the object types referred to above generally are acting as nodes and links which form the overall network structure representing the application system in respect of which reverse engineering is required, the nodes and links forming chains which themselves define the network structure.

The next step in the method of performing a system reverse engineering process is represented by block 20 and involves the identification of logical entry points through which the system can be entered for examination purposes.

Once these entry points have been identified, the next step within the method of the invention involves the examination of the network structure forming the system, which includes selecting entry points from the logical entry points already identified and tracking the chains of nodes and links extending from these entry points, each chain being tracked until the instance of a node that does not have a link or the return of the chain to a previously examined node. This is then followed by a reverse tracking of the chain to a node from which another chain extends, selectively tracking the said other chain and continuing the process in the manner defined until all the chains within the network structure have been tracked, the tracking of the chains including also an examination of each node and link and a recordal of information gathered from this examination of each node and link. It must be understood that when reverse tracking of a chain is referred to, a reverse path along a chain will be followed until a node is identified from which another chain extends that will then be tracked, unless it has already been tracked. If a node or link of unknown type is hit which requires first to be defined, this will be recorded or logged for subsequent attention and reverse tracking will continue until a node is identified from which a chain extends which will permit tracking. The overall objective remains that substantially all the chains within a network structure and particularly all the nodes and links within the structure should be examined and information in respect thereof must be gathered, although nodes and links identified as unimportant or irrelevant could be ignored. In FIG. 1 the blocks 22, 24 and 26 represent this examination process, at the completion of which a complete understanding of the original application system should be possible insofar as all the nodes and links forming chains within the network structure representing the system will have been examined and the properties, functions, attributes, operations and characteristics of the nodes and links will be known.

The final step in the reverse engineering method of the invention hence involves formatting of the information gathered by the examination referred to above, particularly using the information gathered for formatting the application system in a network structure form which is effectively usable, i.e. in a form in which the application system is understandable and the system can again be used for fulfilling its required purpose in a normal manner, while also permitting the application system to be worked with and modified as may be required from time to time. This latter step in the method of forming a system reverse engineering process is represented by the blocks 28 and 30 from which it will be appreciated that the newly formatted application system will be in a form in which predetermined CASE tools and modelling languages can be utilised for creating a model of the application system, if required.

In order to facilitate the application of the method of performing a system reverse engineering process, in accordance with the invention, the method steps associated with the blocks 16 to 30 can be carried out with the aid of a suitable software program or entire software system that has been created for the purpose and particularly for use in conjunction with the development environment of the application system to be reverse engineered. The creation of this software program or entire software system accordingly also may form a part of the method of the invention, it being envisaged in this regard that it may be required to modify the software program from time to time, or to expand the base of "known" object type information, as a result of unknown object types being identified during the examination process, permitting a systems engineer to categorise the object type and then provide the necessary information within the software program and/or "known" base in order to deal with this object type in carrying out the method of the invention as described. In this regard it will be appreciated that the method of the invention could be "manually" carried out in relation to relatively simple application systems, but in relation to practical application systems which do in fact require reverse engineering, the assistance of a suitable software program will be essentially required.

Referring to FIG. 2 of the drawings, in order to explain the method of performing a system reverse engineering process, the process can be equated to the examination of a building having a plurality of rooms that are interlinked with one another in an essentially random fashion via doors between them and where the layout of the building is not known and therefore requires examination. In this diagram, block 40 can be associated with the identification of the application system to be reverse engineered, while block 42 provides for the identification of entrance doors which can lead into the system/building for examination purposes. Different selected entrance doors will then be entered by different members of the examination team involved.

The examination of the rooms within the building as represented by blocks 44, 46, 48, 50, 52, 54, 56, 58, 60, 62 and 64, will effectively represent the examination process associated with the method of the invention insofar as rooms will be examined one after the other, until a room is reached which does not have a further door therein, following which the chain followed will be reversed until a room is reached from where another door extends and from where the examination process can continue. The process as described by the blocks 44 to 64 clearly will result in each room in the building being examined, which will in fact equate to the examination of all the nodes and links within a network structure of an application system.

All the information gathered from the individual rooms will then be set out in a logical format, which operation is represented by the block 66, this logical format enabling one to obtain a clear picture of the layout of the building involved. This layout of the building, which will now be clear, will equate to the new format of the application system that has been created, which will comprise an understandable format which will give a clear understanding of the application system and, particularly, the network structure forming the system.

This new format, insofar as it applies to the building examined, will then permit additions to the building to be effected or a model of the building to be built and this clearly equates to the use of the new format in relation to the method of the invention which permits the creation of a model of the application system involved with the aid of suitable CASE tools, or merely the normal application of the application system which may require system modifications, additions and the like, which could again be logically carried out as a result of the complete understanding of the system which is acquired through the reverse engineering process as described.

Referring to FIG. 3 of the drawings, a typical example of a comprehensive automated reverse engineering method which includes the employment of the method of the invention is described in a block diagram form and in association with the simulation of the method of the invention as illustrated in FIG. 2 of the drawings. The individual steps as illustrated in FIG. 3 of the drawings therefore are cross-referenced as step numbers with reference to FIG. 2 of the drawings, the step numbers being associated with the numbers 1 to 10 included within the blocks forming the diagram illustrated in FIG. 2 of the drawings. As the method of the invention in its application with reference to FIG. 3 will be clear to those skilled in the art, the method as illustrated in FIG. 3 of the drawings is not described in detail hereafter.

It must be appreciated that the method of the invention can be applied in association with many different application systems that require reverse engineering, essentially enabling salvaging of application systems which may otherwise have become obsolete, insofar as the application systems will be formatted into forms in which the systems are again rendered usable through the effective understanding of the systems.

What is claimed is:

1. A method of performing a system reverse engineering process on an application system, which includes the steps of:

gathering the entire application system that requires reverse engineering and identifying each development environment associated with the application system; and with the aid of a suitably programmed processing system, which is provided with a data base of object types in respect of which the nature, characteristics and properties are known and which fall in groups that include process or activity control elements, data management elements and interface elements, performing the steps of:

identifying the object types, as determined by each development environment identified as being associated with the application system, that can serve as starting points from where an examination of the application system can be initiated;

identifying entry points, in the form of object instances of object types identified to serve as starting points from where an examination of the application system can be initiated, for entering the system to carry out an examination of the system;

examining from selected entry points the network structure forming the application system by tracking chains of nodes and links, each chain being tracked until the instance of a node that does not have a link or the return of the chain to a previously examined node, then reverse tracking the chain to a node from which another chain extends and selectively tracking said other chain and continuing the process until all the chains within the network structure have been tracked completely, the tracking of the chains including an examination of each node and each link in the network structure, to the extent that the nature, characteristics and properties of each node and each link can be associated with object types through analysis and understanding thereof, and gathering and recording all the information of each node and each link; and from the information gathered and recorded by the examination of the network structure forming the application system, formatting the information gathered into a form in which it represents the application system in a usable form.

2. A method as claimed in claim 1, which includes, in identifying each development environment associated with the application system, identifying aspects of each development environment selected from a group including programming language and syntax used, the mechanisms of storage of data, the interface of the above, component libraries and code management systems.

3. A method as claimed in claim 1, in which the examination of each node and each link in the chain of the network structure forming the application system, while tracking the chains, includes a comparison and classification of nodes and links as object instances of object types to establish whether they conform with known object types included in the database of the processing system used, or unknown object types and where they conform with unknown object types, identifying the nature, characteristics and properties of these unknown object types and then including them in the said database to become known object types.

4. A method as claimed in claim 1, which includes formatting the information gathered and recorded, by the examination of the network structure forming the application system, into a format into which the information can be exported/reported to at least one of a computer aided software/systems engineering tool, a development environment and a repository, which will enable the creation of a model of the application system.

5. A method as claimed in claim 4, in which formatting includes breaking structures into candidate components by using affinity analysis and mathematical clustering techniques.

6. A method as claimed in claim 2, in which the examination of each node and each link in the chain of the network structure forming the application system, while tracking the chains, includes a comparison and classification of nodes and links as object instances of object types to establish whether they conform with known object types included in the database of the processing system used, or unknown object types and where they conform with unknown object types, identifying the nature, characteristics and properties of these unknown object types and then including them in the said database to become known object types.

7. A method as claimed in claim 2, which includes formatting the information gathered and recorded, by the examination of the network structure forming the application system, into a format into which the information can be exported/reported to at least one of a computer aided software/systems engineering tool, a development environment and a repository, which will enable the creation of a model of the application system.

8. A method as claimed in claim 3, which includes formatting the information gathered and recorded, by the examination of the network structure forming the application system, into a format into which the information can be exported/reported to at least one of a computer aided software/systems engineering tool, a development environment and a repository, which will enable the creation of a model of the application system.

9. A method as claimed in claim 6, which includes formatting the information gathered and recorded, by the examination of the network structure forming the application system, into a format into which the information can be exported/reported to at least one of a computer aided software/systems engineering tool, a development environment and a repository, which will enable the creation of a model of the application system.

10. A method as claimed in claim 7, in which formatting includes breaking structures into candidate components by using affinity analysis and mathematical clustering techniques.

11. A method as claimed in claim 8, in which formatting includes breaking structures into candidate components by using affinity analysis and mathematical clustering techniques.

12. A method as claimed in claim 9, in which formatting includes breaking structures into candidate components by using affinity analysis and mathematical clustering techniques.

* * * * *